US006406726B1

(12) United States Patent
Sextro

(10) Patent No.: US 6,406,726 B1
(45) Date of Patent: Jun. 18, 2002

(54) METHOD AND DEVICE FOR PREPARING ANIMAL FEED MIXTURES

(75) Inventor: Franz-Josef kl. Sextro, Vechta (DE)

(73) Assignee: WEDA-Dammann and Westerkamp GmbH, Lutten (DE)

( * ) Notice: Subject to any disclaimer, the term of this patent is extended or adjusted under 35 U.S.C. 154(b) by 0 days.

(21) Appl. No.: 09/719,407

(22) PCT Filed: Jun. 10, 1999

(86) PCT No.: PCT/EP99/03991

§ 371 (c)(1),
(2), (4) Date: Dec. 26, 2000

(87) PCT Pub. No.: WO99/66806

PCT Pub. Date: Dec. 29, 1999

(30) Foreign Application Priority Data

Jun. 25, 1998 (DE) .......................................... 198 28 221

(51) Int. Cl.[7] ................................................ A01K 5/00
(52) U.S. Cl. ........................ 426/232; 426/324; 426/326; 426/807
(58) Field of Search ................................ 426/232, 324, 426/326, 807

(56) References Cited

U.S. PATENT DOCUMENTS 3,653,908 A * 4/1972 Buck ................................ 99/2
5,780,288 A * 7/1998 Rohwer ........................ 435/238

FOREIGN PATENT DOCUMENTS

| DE | 19521104 | * | 9/1996 |
| EP | 82366 | * | 6/1983 |
| EP | 163080 | * | 12/1985 |
| EP | 455889 | * | 11/1991 |
| GB | 2048095 | * | 12/1980 |
| GB | 2303079 | * | 2/1997 |

* cited by examiner

Primary Examiner—Chhaya D. Sayala
(74) Attorney, Agent, or Firm—Jordan and Hamburg LLP

(57) ABSTRACT

For preparing cattle feed mixtures, especially pumpable liquid feed mixtures, the feed components are added consecutively to a weighing and mixing container and mixed. Before or while the feed mixture is being prepared, the pH of the mixture is measured and, if it exceeds a specified value during a continued mixing process, acid is added as the last additive to the feed mixture until the specified value is reached. For this purpose, a pH measuring probe, which is passed through the wall of the container, is provided in the lower region of the weighing and mixing container.

16 Claims, 1 Drawing Sheet

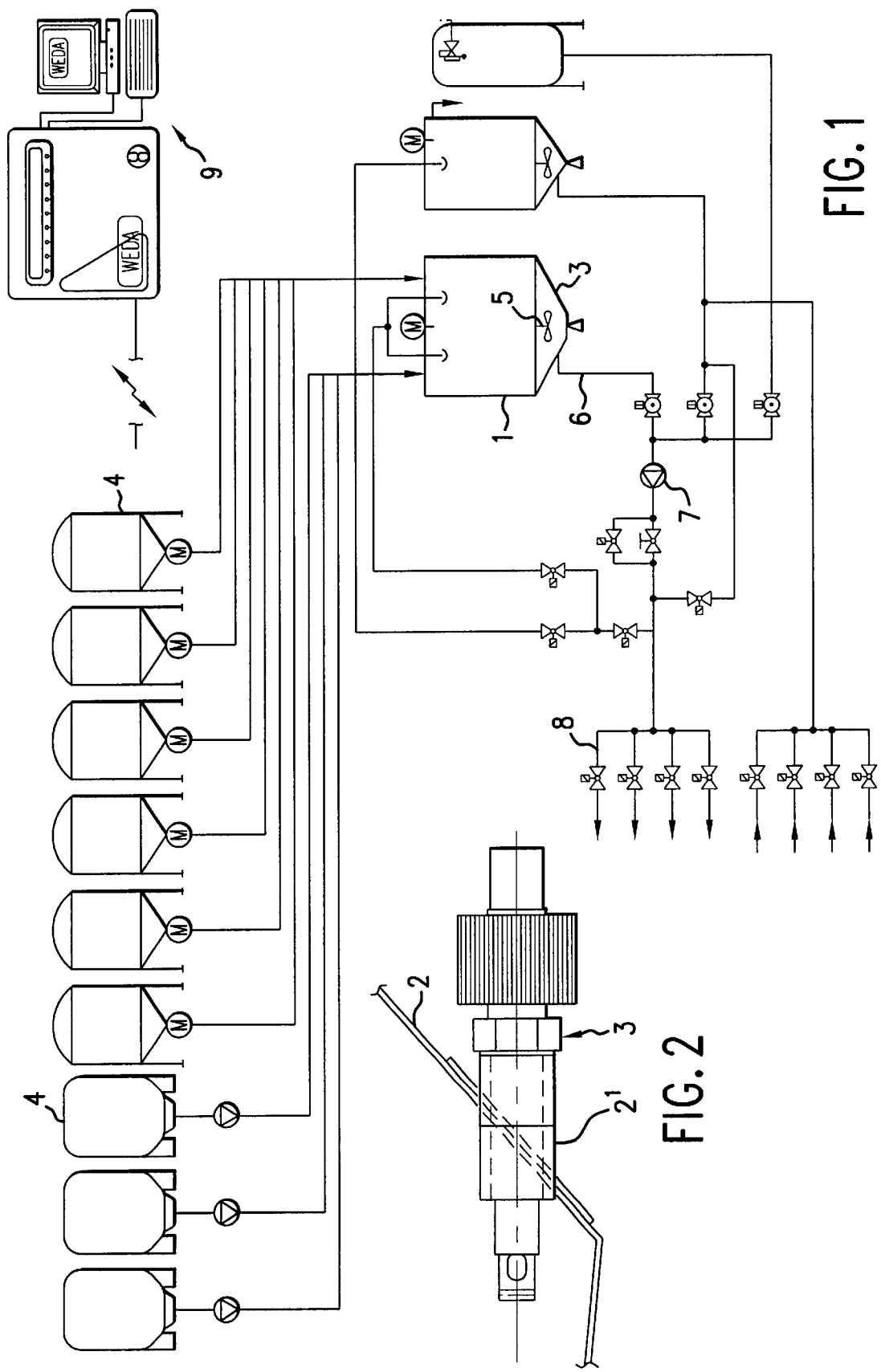

METHOD AND DEVICE FOR PREPARING ANIMAL FEED MIXTURES

The invention relates to a method for preparing cattle feed mixtures as defined in the introductory portion of claim 1 and to a device for implementing the method as defined in the introductory portion of claim 10.

For reasons of feed hygiene, it is desirable that an cattle feed, particularly a liquid feed, has a pH, which is between 4 and 5 and preferably at about 4.5. The invention is concerned with the problem of influencing the pH of the feed mixtures, especially of correspondingly large batches in weighing and mixing containers of feed stations of feeding devices. The invention solves the problem with a method of claim 1 and with a device of claim 10. With respect to further refinements, reference is made to claims 2 to 5 as well as 10 to 12.

The inventive method ensures that, during the preparation of the feed mixture the pH of this feed mixture is determined and, if it is too high, lowered in a specified manner by a gradual addition of acid. Since the addition of acid takes place at the conclusion of the actual preparation process of a batch, it is ensured that there are no further pH changes after the pH is adjusted due to the addition of further feed components. For carrying out the method, the invention furthermore provides a weighing and mixing container, which is provided in the lower region with a pH measuring probe, which is passed through the wall of the container. The sensor of such a measuring probe accordingly lies in a region of particularly intensive feed flow, similar to that which builds up in the course of the mixing process under the action of the conventional stirrer in the weighing and mixing container. Accordingly, it is ensured that pH changes, which occur, are determined rapidly, so that the desired final value in the feed batch can be obtained precisely.

BRIEF DESCRIPTION OF THE DRAWINGS

In the drawing, a feeding device is illustrated diagrammatically in FIG. 1.

FIG. 2 shows a cutout from the container wall in the region of the pH measuring device.

DETAILED DESCRIPTION

The feeding device comprises a weighing and mixing container 1, in the lower portion of which there is a pH measuring probe 3, which is passed through the wall 2 of the container. The measuring probe 3 passes through a sleeve 2', which is welded into the container wall 2 and into which the probe is sealed and fixed. The weighing and mixing container 1 can be charged with feed components from silo 4 and comprises a motor-driven stirrer 5, which has mixing tools revolving centrally also in the lower region of the container. A conveying pipeline 6 discharges from the bottom region of the weighing and mixing container 1. With the help of a feed pump 7, feed can be transported through the conveying pipeline 6 into consumer pipelines 8. A central computer 9 controls the whole of the feeding device by means of a program, which may include a pH program part.

For the preparation of a feed batch, liquid and solid components of the feed are conveyed consecutively into the weighing and mixing container 1, where the amount of feed, increasing corresponding to the amount supplied, is constantly mixed. The pH is measured continuously or at regular intervals already during this buildup of the feed charge, so that, when the charge is finished, a decision can be made by comparing the actual with the nominal value whether or not the addition of acid for adjusting the pH to the desired value is necessary. This is handled either by a computer program, which controls all details of the feed preparation process and comprises a pH program part, or by the measuring probe 3, which can be constructed as a measuring instruments and, at the same time, as a control pulse generator, which controls the addition of acid until a specified preferably adjustable nominal value is reached. If acidification of the feed is required, a nutritionally compatible acid, such as propionic acid, acetic acid or the like is added as the last component to the feed mixture either continuously in a small amount, the mixing process being continued continuously in the weighing and mixing container 1, or a small partial amount is added at intervals. During the addition of acid, the pH is measured either at consecutive intervals or continuously, so that the continuous or intermittent addition of acid can be switched off in good time and the feed batch has the desired pH at the end of the mixing. This pH preferably is 4.5. After that, the delivery of feed from the weighing and mixing container 1 can be commenced.

What is claimed is:

1. A method of preparing a cattle feed mixture in which feed components which comprise said feed mixture are added consecutively to a weighing and mixing container and mixed, the method comprising the steps of:

measuring a pH of the feed mixture one of before and while the feed mixture is being prepared; and adding acid as a last additive to the feed mixture if the pH exceeds a specified value during a continued mixing process; and repeating said step of adding until the specified value is reached.

2. A method according to claim 1, wherein the feed mixture is a pumpable liquid feed mixture.

3. A method according to claim 1, wherein the specified value of the pH in the feed mixture is about 4.5.

4. A method according to claim 1, wherein the acid added in said step of adding acid is a nutritionally compatible acid.

5. A method according to claim 4, wherein said nutritionally compatible acid includes propionic acid.

6. A method according to claim 1, wherein:

said step of measuring includes measuring the pH in the weighing and mixing container one of continuously and at regular intervals during a whole preparation process of a feed batch; and said step of adding acid includes continuously measuring the pH after the feed mixture is prepared during the addition of acid.

7. A method according to claim 1, wherein the acid is added continuously in small amounts.

8. A method according to claim 1, wherein said step of adding includes intermittently adding the acid in small partial amounts, and measuring the pH at a time after a partial addition and a further partial addition is made in said step of intermittently adding.

9. A method according to claim 1, wherein said step of adding includes intermittently adding the acid in small partial amounts, and measuring the pH at a time after said step of intermittently adding and a termination of the preparation process.

10. A method according to claim 1, further comprising controlling a course of the method by a central computer from a start to a finish of the feed preparation.

11. A method according to claim 10, wherein said step of controlling includes comparing an actual value of the pH with a nominal value by the central computer on the basis of a pH control program.

12. A method according to claim 1, wherein an addition of acid in said step of adding acid is controlled directly by comparing an actual pH with a nominal value.

13. A method according to claim 10, wherein said step of adding acid is controlled directly by comparing an actual value of the pH with a nominal value.

14. A method according to claim 1, wherein said step of measuring includes passing a pH measuring probe through a wall of the weighing and mixing container at a lower region of the weighing and mixing container.

15. A method according to claim 14, wherein the measuring probe is constructed substantially only as a measuring probe.

16. A method according to claim 14, wherein the measuring probe is constructed as a measuring instrument and as a control pulse generator.

* * * * *